United States Patent [19]
Reuter et al.

[11] Patent Number: 5,845,672
[45] Date of Patent: Dec. 8, 1998

[54] SOLENOID COIL POSITIONING ASSEMBLY

[75] Inventors: David Fredrick Reuter, Beavercreek, Ohio; Jerry Lee Newton, Richmond, Ind.; Viswanath Seetharaman, Fairborn, Ohio; Raymundo Saenz, Juarez Cwih, Mexico

[73] Assignee: General Motors Corporation, Detroit, Mich.

[21] Appl. No.: 763,137

[22] Filed: Dec. 10, 1996

[51] Int. Cl.⁶ .............................. F16K 43/00; F16K 31/02
[52] U.S. Cl. .................. 137/315; 29/890.124; 137/88.1; 251/129.15; 303/119.2; 335/260; 335/278
[58] Field of Search .................... 137/315, 884, 137/15; 251/129.15; 303/119.2; 29/890.124; 335/202, 260, 278; 439/722

[56] References Cited

U.S. PATENT DOCUMENTS

| | | | |
|---|---|---|---|
| 3,549,119 | 12/1970 | Sellers | 251/129.15 |
| 4,540,154 | 9/1985 | Kolchinsky | 251/129.15 |
| 4,651,971 | 3/1987 | Donahue, Jr. | 251/129.15 |
| 5,127,440 | 7/1992 | Maas et al. | 137/884 |
| 5,137,455 | 8/1992 | Moerbe et al. | 439/34 |
| 5,145,149 | 9/1992 | Moehle | 251/129.15 |
| 5,152,322 | 10/1992 | Maas et al. | 137/884 |
| 5,218,999 | 6/1993 | Tanimoto | 251/129.15 |
| 5,333,836 | 8/1994 | Fukuyo et al. | 251/129.15 |
| 5,364,067 | 11/1994 | Linkner, Jr. et al. | 251/129.15 |
| 5,374,114 | 12/1994 | Burgdorf et al. | 303/119.2 |
| 5,439,279 | 8/1995 | Linkner, Jr. et al. | 251/129.15 |
| 5,449,019 | 9/1995 | Hara | 137/884 |
| 5,460,350 | 10/1995 | Nagashima et al. | 251/129.15 |
| 5,462,344 | 10/1995 | Jakob et al. | 303/119.2 |
| 5,681,099 | 10/1997 | Steffes et al. | 137/884 |

*Primary Examiner*—George L. Walton
*Attorney, Agent, or Firm*—Jeffrey A. Sedlar

[57] ABSTRACT

A solenoid actuated valve includes a first subassembly that carries a coil having its terminal pins attached to a structure such as a circuit board or lead frame. A second subassembly is provided for mating with the first subassembly and carries the valve body. The first subassembly has a solenoid spool including the coil, and a case surrounding the spool. An end plate is suitably locked to the case. A bias spring is provided between the spool and the end of the case. The spool assembly is designed to be freely floating both radially and axially within the coil case and end plate, as restricted by the bias spring. This permits proper location of the coil case to the hydraulic valve body assembly.

13 Claims, 2 Drawing Sheets

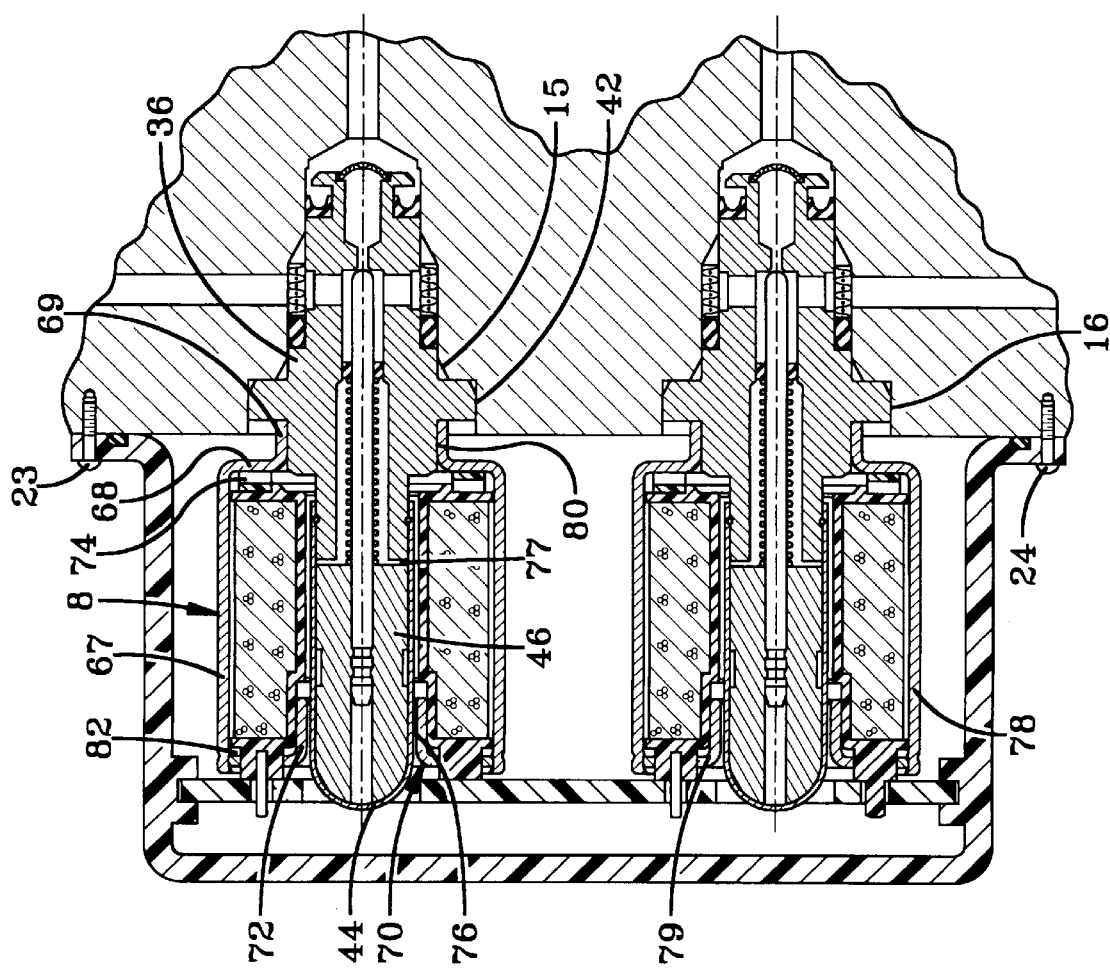

SOLENOID COIL POSITIONING ASSEMBLY

TECHNICAL FIELD

The present invention relates to a solenoid coil positioning assembly and more particularly, to a useful and flexible method of positioning solenoid coils relative to corresponding valve assemblies and an electronic circuit board assembly.

BACKGROUND OF THE INVENTION

Solenoid actuated valves are well known devices. The conventional solenoid's coil effects an electromagnetic force that is useful in positioning movable valve elements in various known manners. An integral part of these devices are the air gaps provided in the electromagnetic circuit of the solenoid. A primary (working), air gap is generally provided between the movable armature and a first non-moving ferromagnetic element. The first non-moving ferromagnetic element generally comprises an integral part of the associated valve's structure. Secondary (parasitic), air gaps are generally provided between the movable armature and other non-moving ferromagnetic elements. The other non-moving ferromagnetic elements generally comprise integral parts of the actuator. When the solenoid is energized, the coil establishes magnetic flux in the ferromagnetic elements which traverses all the air gaps. The size of the air gaps is an important factor in determining the operational characteristics of the device.

Variations in the magnetic flux transfer properties of solenoid actuated valves may be particularly intolerable depending upon the nature of the application within which the device operates. Efficient designs are not accommodating of magnetic flux losses created by inordinately large secondary air gaps. Therefore, a well designed solenoid actuated valve often comprises a robust assembly wherein the actuator and valve elements are securely assembled together as a sealed unit. Such an assembly is constructed to provide a predetermined precision operating characteristic over a wide range of real world operating conditions.

It has been found that a solenoid actuator may be incorporated with a control mechanism by directly attaching the solenoid's coil terminal pins to a circuit board. In this type of device, the solenoid actuated valve comprises two subassemblies. One subassembly carries the actuator's coil with its terminals soldered to the control circuit board. The other subassembly carries the valve body. When the two subassemblies are mated together some facility is generally provided for allowing the coil to move relative to its subassembly and into position for receipt onto the valve body. However, since the coil is preferably soldered to the circuit board prior to mating of the two subassemblies, connection of the coil and valve body may undesirably stress the soldered connections between the coils terminal pins and the circuit board due to, for example, slight mislocations of the positioning of both subassemblies from normal manufacturing tolerances.

Provisions that allow movement of the coil for assembly purposes may also become undesirable when the solenoid actuated valve is placed in service. Coil movement may be induced by vibratory conditions that exist in the solenoid actuated valve's operating environment. Vibration induced coil movement also transfers loads to the soldered terminal pin connection. Therefore, a solenoid actuated valve's design should prevent this condition from occurring. Accordingly, a solenoid actuated valve design is required that: provides ease of assembly and disassembly, exhibits good magnetic flux transfer characteristics, and is able to withstand harsh vibratory environments.

SUMMARY OF THE INVENTION

It is a goal of the present invention to provide a solenoid actuated valve that: is constructed from two subassemblies that are easily assembled and disassembled, exhibits good magnetic flux transfer characteristics, and is able to withstand harsh vibratory environments. In accordance with this goal, a solenoid actuated valve is provided that is designed according to concepts that are equally applicable to normally closed valves, normally open valves, multi-function valves, and other typical related types of valves. The solenoid actuated valve includes a first subassembly that carries a coil having its terminal pins attached to a structure such as a circuit board or rigid lead frame. A second subassembly is provided for mating with the first subassembly. The second subassembly carries the valve body which may be further attached to a valve housing utilized for directing the flow of hydraulic fluid.

In accordance with a preferred embodiment of the present invention a first subassembly includes a solenoid spool including the coil and a case surrounding the spool. An end plate is suitably locked to the case preferably by a means such as crimping or a roll forming operation. A bias spring is provided between the spool and the end of the case opposite the end plate. The spool assembly is designed to be freely floating both radially and axially within the coil case and end plate as restricted by the bias spring. This permits the coil case to be properly located to the hydraulic valve body assembly.

Radial clearances permit the case to move laterally to mate with its corresponding valve assembly so that close clearances between the case and the valve's actuator housing, and the end plate and the valve's actuator sleeve can be maintained. The radial clearances between the end plate and armature and between the case and valve housing determine the secondary air gaps which can be kept sufficiently small to minimize magnetic flux losses providing a more efficient valve design. Axial clearance between the spool and the case is accounted for by the bias spring which biases the spool towards the end plate. The case is thereby, biased toward the valve assembly. As the two subassemblies are mated, the distance between the circuit board and the valve block mounting face is set at a predetermined distance to allow the spring to flex providing a fixed load between the case and the spool. This ensures that there is maximum case-to-valve body and end cap-to-sleeve overlap for maximized magnetic flux transfer. In addition, the end face of the case acts as a positive stop and provides additional area for the flux path. The loading imparted by the bias spring prevents undesirable movement of the coil during periods of vibration typically found in the solenoid actuated valve's operating environment. The axial loading of the bias spring is absorbed by the spool overmold on the terminals which rests against the circuit board and acts as a positive stop and not by the solder joint itself. These design features are intended to minimize the solder joint's exposure to excessive stress levels from vibratory loads or to bias spring axial loads and ensure a robust, long-lived design.

The spool's bobbin molding preferably includes a number of projections that rest upon and/or extend through the end plate. These projections serve a number of functions including: providing a surround and locator for the terminal pins of the coil's wire, providing a positive stop to assist in location of the coil assembly, and as projections which pass through auxiliary holes in the circuit board or lead frame to assist in assembly. The coil terminals which are directly attached to a circuit board, through means of a convenient assembly technique such as wave soldering, are supported by projections from the spool molding. In addition, further projections are preferably employed that serve as an error-proofing technique to assure that the correct coil assembly is installed in the correct location on the circuit board or other mating device.

Through means of the present invention the radial clearances are minimized. This is important to minimize magnetic flux transfer losses. Therefore, the required radial clearances are provided between the mating metal-to-metal parts of the two individual subassemblies to allow for part-to-part assembly location tolerances for two or more complete valve assemblies to be mounted on a common circuit board. Some amount of slip-fit clearance must be provided to allow for variations in tolerancing of the individual component parts of the two subassemblies. By pre-mounting the spool assembly including the coil to the preferred circuit board in a non-movable condition and allowing the case and end plate to move during assembly, stress imparted to the coil solder joints is prevented and flux transfer paths are maximized. This is particularly important in applications such as solenoid actuated valve installations in automotive anti-lock braking system modulators. Typically a number of solenoid actuated valves are provided in close proximity. The subassembly carrying the actuator spools is provided with a number of such units preassembled to a circuit board or other device prior to mating to the other hydraulic valve body housing subassembly.

BRIEF DESCRIPTION OF THE DRAWINGS

FIG. 2 is a fragmentary cross-sectional illustration of the components illustrated in FIG. 1 shown in an assembled condition.

DETAILED DESCRIPTION OF THE PRESENTLY PREFERRED EMBODIMENT

Figure 1:
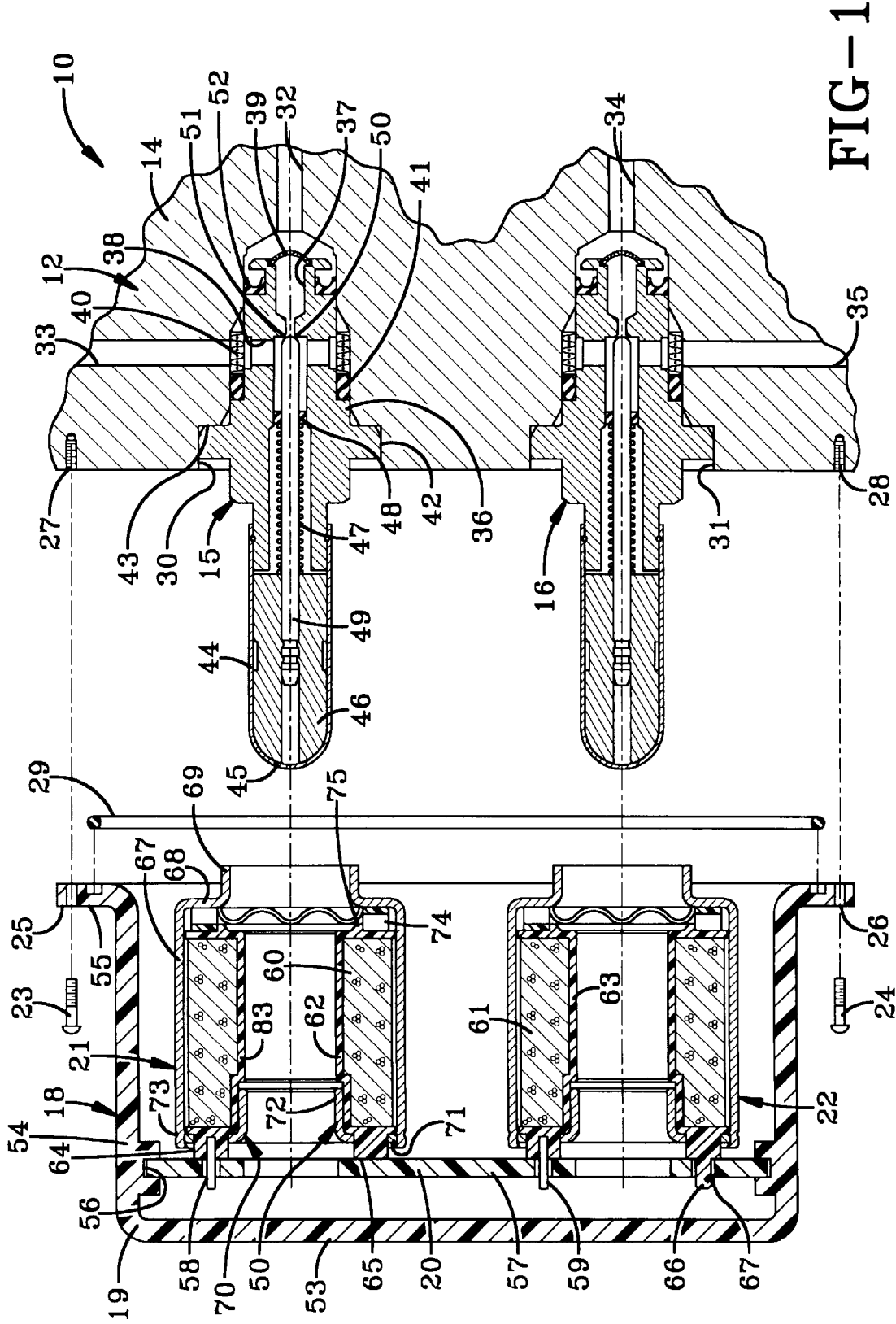
FIG. 1 is a partially exploded, fragmentary cross-sectional illustration of an ABS modulator incorporating multiple solenoid actuated valves.

Referring to the drawings, illustrated in FIG. 1 is a portion of an ABS modulator for an automotive application designated in the aggregate as 10. Modulator 10 includes a subassembly 12 with a valve block 14 carrying a pair of hydraulic valves 15 and 16. Modulator 10 also includes a subassembly 18 that includes a cover 19 with a circuit board 20 supporting spool assemblies 21 and 22. A pair of fasteners 23 and 24 are provided for extending through the openings 25 and 26 respectively, of the cover 19 and into the threaded apertures 27 and 28 of the valve block 14. A seal 29 is provided for receipt between the cover 19 and the valve block 14.

More specifically, subassembly 12 includes a valve block 14 formed of an acceptably rigid material such as metal with stepped bores 30 and 31 formed in the valve block 14. The stepped bore 30 receives the hydraulic valve 15 and the step bore 31 receives the hydraulic valve 16. The valves 15 and 16 are both illustrated as normally open valves in the present embodiment. However, a combination of normally open and normally closed valves or valves with different or multiple operating characteristics may be employed. Bores 32 and 33 intersect stepped bore 30 and with the interposed valve 15 provide a controllable flow path through the step bore 30. Bores 34 and 35 intersect the stepped bore 31 and with the interposed valve 16 provide a controllable flow path therethrough.

The hydraulic valve 15 includes a body 36 that is received within the step bore 30. The body 36 includes a longitudinal bore 37 and a transverse bore 38 intersecting the longitudinal bore 37. An opening of the longitudinal bore 37 is covered by a filter 39 and an opening of the transverse bore 38 is covered by an annular filter 40. A seal 41 is provided between the body 36 and the valve block 14 within the step bore 30. The body 36 includes an annular shoulder 42 that mates with step 43 for accurately setting the depth of the hydraulic valve 15 within the valve block 14. Peening, staking, or other suitable processes (not illustrated) to form the valve block 14 base material over the top of the solenoid valve body shoulder 42 may also be suitably utilized to positively retain the valve body 36 in the stepped bore 30. A cylindrical sleeve 44 with a closed end 45 is received over the body 36. An armature 46 is slidably received in the cylindrical sleeve 44 and is biased towards the closed end 45 by a spring 47. Spring 47 bears against support 48. A rod 49 is carried by the armature 44 and extends through the spring 47 and support 48 with an end 50 interacting with the valve seat 51 to provide a flow control mechanism in the hydraulic valve 15 between the bores 32 and 33. A seal 52 is carried by the valve body 36 and provides an one-way bypass from the bore 33 to the bore 32 around the valve seat 51. The components of the hydraulic valve 16 are substantively identical to the components of the hydraulic valve 15. The hydraulic valve 16 provides a controllable flow path between the bores 34 and 35.

The other subassembly 18 includes the cover 19 which provides a sealed closure over the electrical components of the modulator 10. The cover 19 includes an end wall 53 with an integral side wall 54 that extends to an outer turn flange 55. The outer turn flange 55 provides a means of sealingly engaging the subassembly 12. The cover 19 is formed from a material such as molded plastic or cast aluminum and includes an integral groove 56 which receives and locates a circuit board 57. An electrical connection (not illustrated) is provided outside the cover 19 for communication with the circuit board 57.

The circuit board 57 carries spool assemblies 21 and 22 with solder joints provided at the terminal pins 58 and 59 and other terminal pins (not illustrated) for communication between a conductive grid (not illustrated) on the circuit board 57 and the coil 60 and 61 of the spool assemblies 21 and 22, respectively. The coil 60 and 61 are comprised of a plurality of turns of wire wound on molded bobbins 62 and 63.

The bobbin 62 includes an overmold extension 64 that surrounds the terminal pin 58 and provides a stop against the circuit board 57. The bobbin 62 also includes an integral stop 65 that, in cooperation with the extension 64, sets the position of the coil assembly 21 relative to the circuit board 57. The bobbin 63 includes an additional integral projection 66 that mates with an opening 67 in the circuit board 57. This provides a means of assuring that the spool assemblies 21 and 22 are assembled in the proper positions. Positioning is important for applications such as those wherein the spool assemblies 21 and 22 have different internal windings for operation within the modulator 10.

The spool assembly 21 includes a case 67 that surrounds the bobbin 62 and coil 60. The case 67 includes an inwardly bent face wall 68 with an axially directed extension 69. An end plate 70 includes an end 71 and an axially extending wall 72 that is received within the central opening 83 of the bobbin 62. The end plate 70 is secured within the case 67 by means of a roll-formed grooved 73. A bias spring 74, in the form of an annular wave spring as shown, or finger-type spring (not illustrated), is provided between the bobbin 62 and the face wall 68 of case 67. The bias spring 74 may be held in position by a suitable device such as rib 75. The bias spring 74 forces the case 67 towards the subassembly 12, pulling the end plate 70 into the bobbin 62. Clearance is provided so that the case 67 and end plate 70 are movable both axially and laterally relative to the coil 60 and bobbin 62.

Referring to FIG. 2, the axial and lateral movement is provided so that when the subassemblies 12 and 18 are mated together, the case 67 and the end plate 70 are movable for self-alignment with the hydraulic valve 15. Similarly, the case 78 and end plate 79 are movable for self-alignment with the valve 16. The bias spring 74 is compressed as the fasteners 24 and 25 are torqued through means of force applied by the face wall 68 induced by engagement of the extension 69 with the annular shoulder 42, opening the space 82. The axially extending wall 72 of the end plate 70 is self-aligning with the cylindrical sleeve 44. This means that the clearance 76 provided between the sleeve 44 and the axially extending wall 72 can be minimized which optimizes solenoid valve efficiency by minimizing secondary air gaps. Some minimal clearance 76 is necessarily provided so that a slip fit exists between the sleeve 44 and the end plate 70 to account for tolerance variations and to ensure that a bind is not imparted into sliding movement of the armature 46 when assembling the unit.

The magnetic circuit of the now assembled solenoid actuated valve 8 includes the end plate 70, case 67, valve body 36 and the armature 46. The primary air gap 77 is provided between the armature 46 and the valve body 36. The secondary air gaps are provided by the nonmagnetic sleeve 44 and the space 76 between the armature 46 and the end plate 70, and at the juncture 80 between the case extension 69 and valve body 36. The axially extending wall 72 provides a maximum interface area at the secondary air gap. Similarly, the axially extended extension 69 of the case 67 provides a maximum interface area for flux transfer between the case 67 and the valve body 36. Allowing the end plate 70 to move for self-alignment with the cylindrical sleeve 44 provides a means whereby the clearance 76 is minimized so that the distance of the secondary air gap is minimized. Permitting movement of the case 67 and end plate 70 allows the coil 60 and bobbin 62 to remain in a fixed position relative to the circuit board 57. This allows a number of additional valve coils to be soldered on a common circuit board and accommodating the position-to-position variation of the corresponding mating valve bodies while still maintaining a minimized secondary air gap on each individual valve assembly.

The position stop provided by the extension 64 and stop 65 of the bobbin 62 assist in minimizing or eliminating solder joint stress during the assembly process. In addition, when assembled, the bias spring 74, which bears against the bobbin 62, face wall 68, biasing extension 69 against the valve body shoulder 42, inhibits movement of the coil 60 and bobbin 62 during operation of the solenoid actuated valve 8 to reduce the transmission of loads to the solder joints. This is important in the under-hood environment of an automobile wherein an ABS system's modulator 10 is typically positioned. Vibrations transmitted to the vehicle through the suspension system and secondary vibrations introduced by operation of the ABS unit are inhibited from being transferred to the solder joints by the normal pre-load imparted from the case 67 on the valve body shoulder 42. The subassembly 12 is readily disassembled from the subassembly 18 by removal of the fasteners 24 and 25. The cover 19 provides a fully enclosed sealed housing around the solenoid operated valve assembly.

We claim:

1. A solenoid coil positioning assembly comprising:
   a valve block having a bore;
   a valve with a body having an annular shoulder wherein the valve is disposed in the bore;
   a sleeve engaging the body;
   an armature slidably carried in the sleeve adjacent the body;
   a spool including a coil wound on a bobbin with a central opening wherein the spool is received over the sleeve;
   a case carried about the spool;
   a bias spring disposed between the case and the spool and biasing a portion of the case toward engagement with the annular shoulder to inhibit movement of the spool to reduce various transmission loads.

2. A solenoid coil positioning assembly according to claim 1 further comprising an end plate having an axially extending wall received within the central opening of the bobbin and an end wall engaging the case.

3. A solenoid coil positioning assembly according to claim 2 wherein the spool is housed by the case and the end plate and wherein the case and end plate are movable both axially and laterally relative to the spool prior to assembly wherein the spool is received over the sleeve and wherein the case and the end plate are inhibited from moving relative to the spool by the bias spring after assembly when the spool is received over the sleeve.

4. A solenoid coil positioning assembly according to claim 3 wherein the coil includes a terminal and further comprising a circuit board rigidly connected to the terminal.

5. A solenoid coil positioning assembly according to claim 4 wherein the bobbin includes an integral extension that surrounds the terminal and bears against the circuit board and an integral stop separate from the terminal that bears against the circuit board wherein the extension and the stop inhibit relative movement between the coil and the circuit board.

6. A solenoid coil positioning assembly according to claim 5 wherein the circuit board includes an opening having a certain shape and the bobbin includes an integral projection on the stop and shaped to mate with the opening wherein the projection extends into the opening to ensure that the spool is properly assembled to the circuit board.

7. A solenoid coil positioning assembly according to claim 4 wherein the case includes a radially extending face wall and an axially directed extension extending from the face wall wherein the axially directed extension is received onto the valve's body and bears against the annular shoulder so that the bias spring is compressed between the face wall and the bobbin forcing the end wall of the end plate away from the bobbin.

8. A solenoid coil positioning assembly according to claim 7 further comprising a cover carrying the circuit board wherein the cover is attached to the valve block with a seal disposed between the cover and the valve block and wherein the bias imparted by the bias spring between the case and the spool is carried by the circuit board and the cover, and is transferred to the valve block.

9. A solenoid coil positioning assembly according to claim 8 wherein a clearance gap exists between the axially extending wall of the end plate and the sleeve and wherein the clearance gap is minimized by permitting movement of the case and end plate relative to the spool.

10. A solenoid coil positioning assembly, for providing relative movement between a coil and the coil's housing so that the coil is attachable to a circuit board prior to being assembled to a mating valve, comprising:

a first subassembly including the coil's housing with a cover, a circuit board carried by the cover, and the coil which is wound on a bobbin and is attached to the circuit board in a substantially rigid manner by at least one terminal pin, wherein the coil's housing has a case with an open end, a radially directed face wall and an axially directed annular extension extending from the face wall, wherein the case is disposed about the coil and is locked thereon by being engaged with an end plate at the case's open end, wherein the case is movable in an axial direction and a transverse direction relative to the coil, with a bias spring disposed between the face wall and the bobbin which biases the end plate toward the coil and biases the face wall away from the coil; and a second subassembly including a valve block carrying the valve wherein the valve has a body with an annular shoulder, wherein a sleeve engages the body, wherein an armature is slidably carried in the sleeve and wherein the sleeve projects away from the valve block;

wherein when the first and second subassemblies are mated together the case and end plate are self positionable on the coil to align with the sleeve and valve body wherein the axially directed annular extension engages the valve body and bears against the annular shoulder providing a positive stop causing the face wall to compress the bias spring and exert a load between the case and the bobbin to inhibit relative movement therebetween to reduce various transmission loads, wherein the end plate is positioned about the sleeve with a minimum of clearance space in-between the end plate and the sleeve and wherein the cover is secured to the valve block;

whereby relative movement between the circuit board and the coil is minimized by the load exerted by the bias spring so that a terminal pin connection between the terminal pin and the circuit board is not stressed and magnetic flux transfer between the valve body and the case and between the end plate and the armature is maximized.

11. A solenoid coil positioning assembly according to claim 10 wherein the bobbin is molded with an integral stop that bears against the circuit board to minimized stress on the terminal pin connection.

12. A solenoid coil positioning assembly according to claim 10 wherein the bobbin is molded with an integral projection which is received in an opening in the circuit board to assure proper assembly therebetween.

13. A solenoid coil positioning assembly, for providing relative movement between a coil and the coil's housing so that the coil is attachable to a circuit board prior to being assembled to a mating valve, comprising:

a first subassembly including the coil's housing with a cover, a circuit board carried by the cover, and the coil which is wound on a bobbin that includes an overmold extension surrounding a terminal pin and a stop separate from the terminal pin wherein the stop includes an extension that extends into an opening in the circuit board to position the bobbin relative to the circuit board and wherein the coil is attached to the circuit board in a substantially rigid manner by the terminal pin, wherein the coil's housing has a case with an open end, a radially directed face wall and an axially directed annular extension extending from the face wall, wherein the case is disposed about the coil and is locked thereon by being engaged with an end plate at the case's open end, wherein the case is movable in an axial direction and a transverse direction relative to the coil, with a bias spring disposed between the face wall and the bobbin which biases the end plate toward the coil and biases the face wall away from the coil and wherein the end plate includes an axially extending wall that extends into the coil and radially inside individual windings of the coil; and a second subassembly including a valve block carrying the valve wherein the valve has a body with an annular shoulder, wherein a sleeve engages the body, wherein an armature is slidably carried in the sleeve and wherein the sleeve projects away from the valve block;

wherein when the first and second subassemblies are mated together the case and end plate are self positionable on the coil to align with the sleeve and valve body wherein the axially directed annular extension engages the valve body and bears against the annular shoulder providing a positive stop causing the face wall to compress the bias spring and exert a load between the case and the bobbin to inhibit relative movement therebetween to reduce various transmission loads, wherein the end plate is positioned about the sleeve with a minimum of clearance space in-between the end plate and the sleeve and wherein the cover is secured to the valve block;

whereby relative movement between the circuit board and the coil is minimized by the load exerted by the bias spring so that a terminal pin connection between the terminal pin and the circuit board is not stressed and magnetic flux transfer between the valve body and the case and between the end plate and the armature is maximized.

* * * * *